United States Patent
L'Aot et al.

(10) Patent No.: US 8,197,012 B2
(45) Date of Patent: Jun. 12, 2012

(54) DEVICE FOR SUPPLYING A HYDRAULIC BRAKE CIRCUIT COMPRISING A PARTICLE FILTER

(75) Inventors: Jean-Michel L'Aot, Stains (FR);
Sylvain Lenczner, Paris (FR);
Christophe Duchossoy, Viarnes (FR);
Olivier Beaures-D'Augeres, Barcelone (ES)

(73) Assignee: Robert Bosch GmbH, Stuttgart (DE)

( * ) Notice: Subject to any disclaimer, the term of this patent is extended or adjusted under 35 U.S.C. 154(b) by 1026 days.

(21) Appl. No.: 12/124,628

(22) Filed: May 21, 2008

(65) Prior Publication Data

US 2008/0289917 A1    Nov. 27, 2008

(30) Foreign Application Priority Data

May 21, 2007   (FR) ...................... 07 03600

(51) Int. Cl.
*B60T 17/00* (2006.01)
(52) U.S. Cl. ............... 303/1; 60/585; 60/534; 137/574; 137/558
(58) Field of Classification Search ........ 303/1; 60/585, 60/534, 535, 592; 137/550, 558, 574, 587; 73/305, 306
See application file for complete search history.

(56) References Cited

U.S. PATENT DOCUMENTS

| | | | | |
|---|---|---|---|---|
| 4,805,668 A | * | 2/1989 | Genter et al. | 137/558 |
| 4,841,107 A | * | 6/1989 | Tandler et al. | 200/84 C |
| 5,254,815 A | * | 10/1993 | Nakano et al. | 200/84 C |
| 6,105,611 A | * | 8/2000 | Ando et al. | 137/558 |
| 6,913,040 B2 | * | 7/2005 | Crossman et al. | 137/587 |
| 6,984,000 B2 | * | 1/2006 | Fraisse et al. | 303/1 |
| 6,996,985 B2 | * | 2/2006 | Bornkessel et al. | 60/585 |
| 7,261,123 B2 | * | 8/2007 | Kim | 137/550 |
| 7,261,382 B2 | * | 8/2007 | Hayashi | 303/1 |
| 7,448,211 B2 | * | 11/2008 | Hayashi | 60/585 |
| 7,779,862 B2 | * | 8/2010 | Sanderson et al. | 137/574 |

FOREIGN PATENT DOCUMENTS

DE   10002118 A1   7/2001
EP    1570890 A1   9/2005

OTHER PUBLICATIONS

FR0703600 Search Report and Written Opinion.

* cited by examiner

*Primary Examiner* — Robert A Siconolfi
*Assistant Examiner* — Mariano Sy
(74) *Attorney, Agent, or Firm* — Michael Best & Friedrich LLP

(57) ABSTRACT

A device for supplying a downstream hydraulic brake fluid to a hydraulic brake circuit of a motor vehicle equipped with a clutch includes an enclosure intended to contain the hydraulic fluid, the enclosure being provided with at least one outlet nozzle and with an inlet orifice. The enclosure forms a downstream portion of a reservoir, the reservoir comprising an upstream portion forming an upstream enclosure intended to collect an upstream hydraulic fluid from the clutch of the vehicle. The upstream enclosure 4 includes at least one inlet nozzle serving to transfer the upstream hydraulic fluid toward the upstream enclosure 4. The inlet orifice is an intermediate orifice whereby the upstream enclosure opens into the downstream enclosure, the intermediate orifice being equipped with a means for filtering the upstream hydraulic fluid.

21 Claims, 5 Drawing Sheets a # DEVICE FOR SUPPLYING A HYDRAULIC BRAKE CIRCUIT COMPRISING A PARTICLE FILTER

BACKGROUND OF THE INVENTION

The invention relates to the field of motor vehicles and more specifically to a brake fluid reservoir supplying the hydraulic brake and clutch circuits.

In a general manner, a hydraulic brake circuit comprises a brake fluid reservoir containing a hydraulic fluid, this fluid being intended to transmit a hydraulic pressure to the brakes of the front and rear wheels that is formed by the movement of a piston in a master cylinder when the driver of the vehicle actuates a braking means, for example the brake pedal.

There are other hydraulic systems in motor vehicles, particularly the clutch, which can use the same hydraulic fluid as the hydraulic brake circuit. In order to simplify the hydraulic circuits, a common hydraulic fluid reservoir is used for both circuits, namely for the brake circuit and for the clutch circuit. These reservoirs are typically made of plastic in the form of two shells assembled by welding.

Since the hydraulic absorption of the brake circuit increases with wear on the friction elements, there is a progressive loss of brake fluid, which means that brake fluid should be periodically added to the reservoir so as to keep a substantially constant fluid level in the brake fluid reservoir. By contrast, wear on the clutch usually results in hydraulic fluid being driven back into the reservoir. There is thus a transfer of hydraulic fluid from the reservoir toward the brake. If a common hydraulic fluid reservoir is used for the brake circuits and the clutch circuits, there may occur a progressive transfer of hydraulic fluid from the clutch toward the brake. This liquid may be loaded with solid, metal or non-metal, particles or debris which detach, by abrasion or any other mechanism, from the metal walls with which the fluid is in contact. The largest dimension of these particles or debris is typically between 100 and 500 µm.

They can be entrained into the brake circuit, where their presence is particularly undesirable. Specifically, anti-lock braking systems (ABS) typically include electronically operated valves which are generally solenoid ball valves; these solenoid valves can become impaired when solid particles or debris passes through them. Similarly, an ABS-type system includes seals which are liable to become impaired if they come into contact with solid particles or debris.

SUMMARY OF THE INVENTION

The problem that the present invention is intended to solve is that of positioning, at a suitable point in the hydraulic brake or clutch circuit, a filtration means which makes it possible to confine the solid particles or debris entrained by the hydraulic fluid without any risk of this filtration means clogging up during use.

The invention relates to a device for supplying a hydraulic brake circuit which, by means of filtration, prevents brake circuits from being contaminated with particles originating from the hydraulic clutch circuit.

The device for supplying a hydraulic brake fluid, termed a downstream hydraulic fluid, to a hydraulic brake circuit of a motor vehicle equipped with a hydraulically controlled clutch comprises an enclosure intended to contain said hydraulic fluid, said enclosure being provided with at least one outlet nozzle supplying said hydraulic circuit, and with an inlet orifice allowing said downstream hydraulic fluid to be introduced into said enclosure so as to compensate for any loss or consumption of said downstream hydraulic fluid in said hydraulic brake circuit.

It is characterized in that:
a) said enclosure is an enclosure, termed a downstream enclosure, forming a portion, termed a downstream portion, of a reservoir, said reservoir comprising a portion, termed an upstream portion, forming an enclosure, termed an upstream enclosure, intended to be supplied with a hydraulic fluid, termed an upstream hydraulic fluid, from the clutch of said vehicle,
b) said upstream enclosure comprises at least one nozzle, termed an inlet nozzle, said inlet nozzle serving to transfer said upstream hydraulic fluid from said clutch toward said upstream enclosure,
c) said inlet orifice is an intermediate orifice whereby said upstream enclosure opens into said downstream enclosure, said intermediate orifice being equipped with a means for filtering said upstream hydraulic fluid so as to continuously convert said upstream hydraulic fluid, typically loaded with solid particles, into said downstream hydraulic fluid devoid of solid particles and thus fit for supplying said brake circuit.

The combination a) to c) of the means characteristic of the invention makes it possible to solve the problems addressed. Specifically, by purifying and transferring the upstream hydraulic fluid from the clutch chamber, it makes it possible to provide the additional brake fluid necessary to compensate for the losses of brake fluid or hydraulic fluid in the brake circuit without requiring an external input of brake fluid.

The device according to the invention additionally has the advantage of being compact, which means that it can be easily installed in a motor vehicle.

BRIEF DESCRIPTION OF THE DRAWINGS

All the figures relate to the invention.

FIG. 2a is a side view from below.

FIG. 2b is a side view from above.

FIGS. 3a and 3b are perspective views relating to a filtration means 5 comprising a part termed a short annular part 50a.

FIG. 3a is a side view from above.

FIG. 3b is a side view from below.

FIG. 4a is a side view from above.

FIG. 4b is a side view from below.

DETAILED DESCRIPTION

Figure 5A:
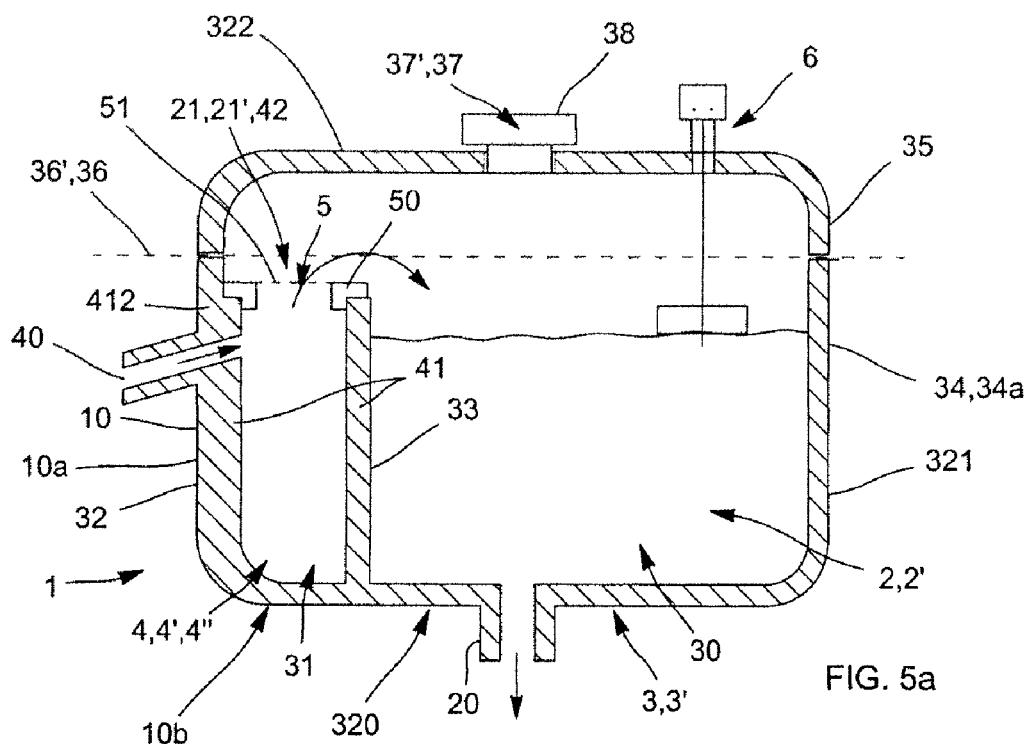
FIG. 5a is a schematic and functional representation of the device 1 in section on a vertical plane comprising said axial direction 11.

As can be observed from FIG. 5a, said reservoir 3 can comprise an outer wall 32, said outer wall 32 being traversed by said outlet 20 and inlet 40 nozzles and comprising a bottom portion 320 forming a base, a lateral portion 321 forming a side wall and an upper portion 322 forming a crown, and an inner wall 33 forming, together with said filtration means 5, a partition of said reservoir 3 which isolates said upstream 4 and downstream 2' enclosures. Other vertical or substantially vertical bulkheads (not shown) extend from its base and over some of the height of the reservoir.

Figure 5B:
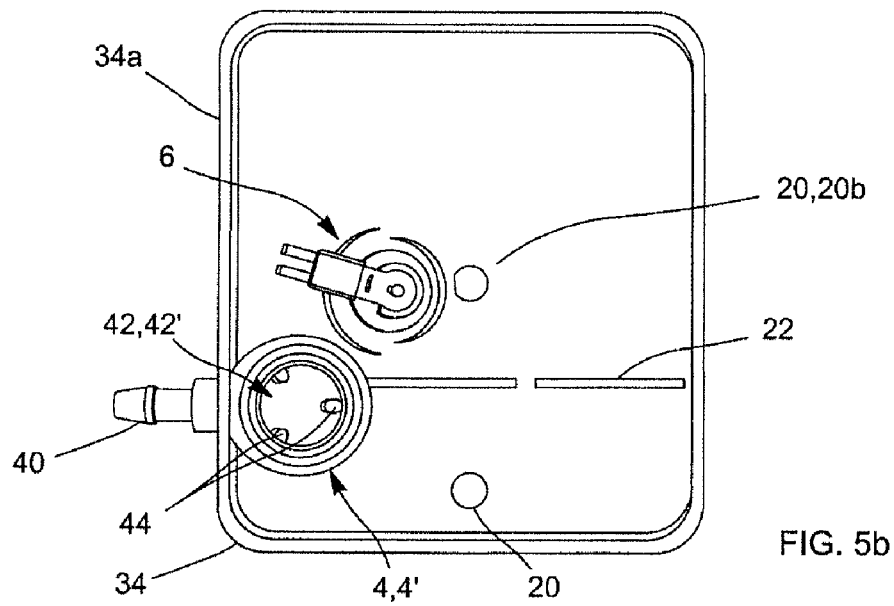
FIG. 5b is a view from above of the lower shell 34 in which the detection means 6 has been represented.

As can be seen from FIGS. 5a and 5b, said upstream enclosure 4 can form a container body 4' equipped with a wall, termed an upstream wall 41, comprising an opening 42, typically an upper opening 42', cooperating with said filtration means 5, one portion of said upstream wall 41 forming said inner wall 33, the other portion of said upstream wall 41 forming a wall, termed a common wall 10, with said outer wall 32, said common wall 10 being traversed by said inlet nozzle 40, typically perpendicular to said common wall 10. Said common wall 10 can comprise a first common wall 10a forming part of said lateral portion 321 of said reservoir 3.

Furthermore, said common wall 10 can comprise a second common wall 10b forming part of said bottom portion 320 of said reservoir 3.

According to another configuration, which has not been illustrated by a figure, said common wall 10 can optionally comprise a third common wall forming part of said upper portion 322 of said reservoir 3.

Figure 4A:
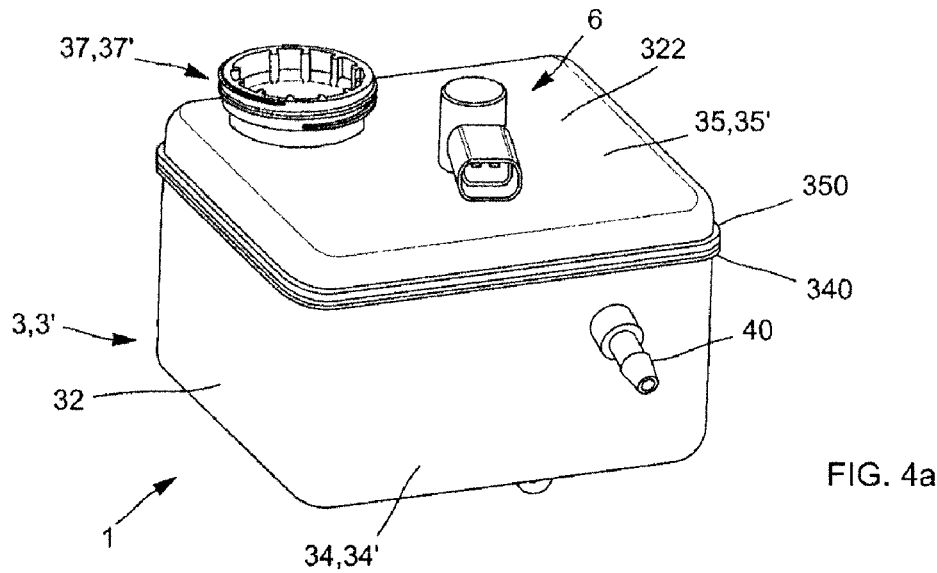
FIGS. 4a and 4b are perspective views of the device 1 comprising a reservoir 3 equipped with a lower shell 34 and with an upper shell 35 which forms a lid for the lower shell 34.
Figure 4B:
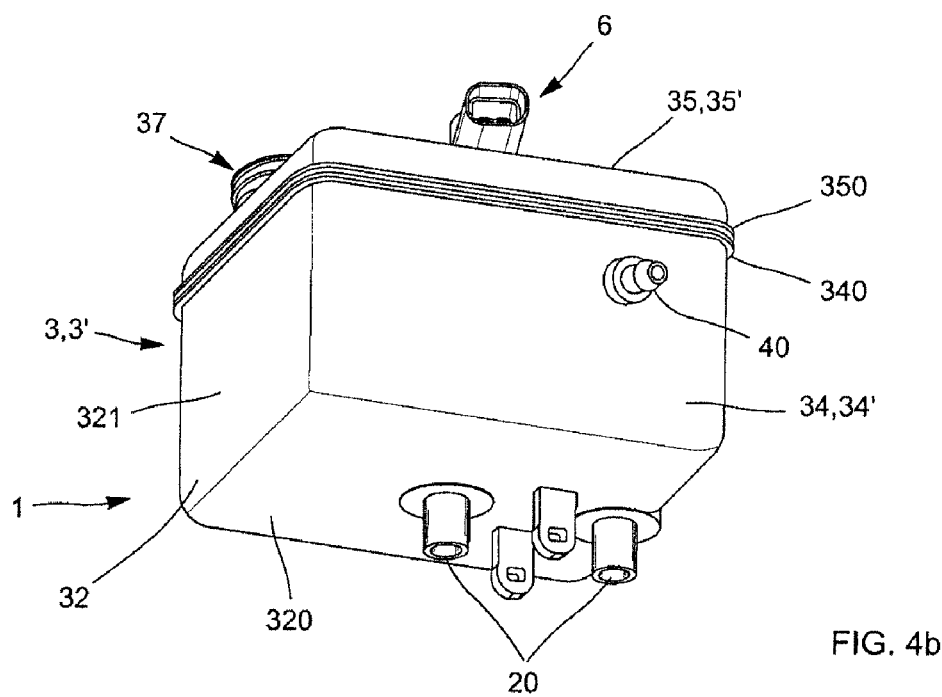

As illustrated in FIGS. 4a and 4b, said reservoir 3 can be a reservoir 3' made of plastic comprising a shell, termed a lower shell 34, and a shell, termed an upper shell 35, said lower 34 and upper 35 shells being molded parts 34', 35' assembled by their assembly flanges, said lower shell 34 having a flange, termed an upper assembly flange 340, cooperating with a flange, termed a lower assembly flange 350, of said upper shell 35 in an assembly plane 36 so as to form said reservoir 3.

Figure 1A:
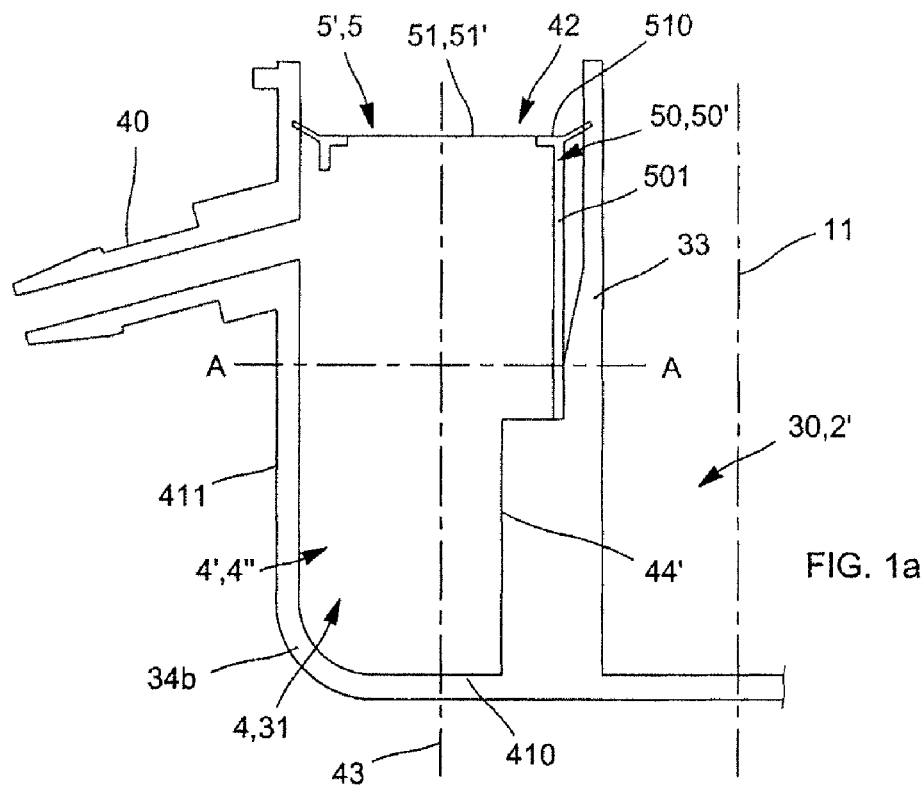
FIG. 1a is a section through part of the device 1 on a vertical plane comprising an axial direction 11.
Figure 1B:
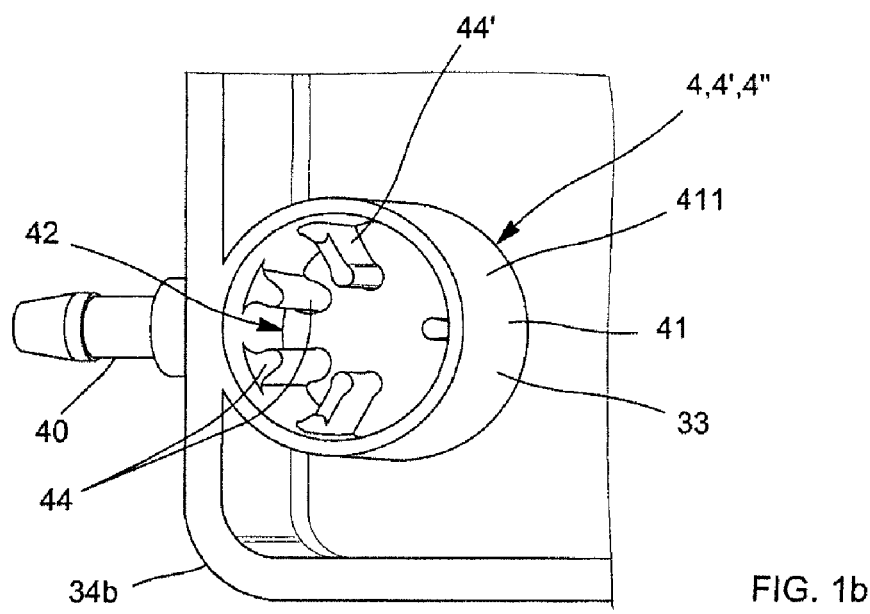
FIG. 1b is a perspective view from above of said part of FIG. 1a prior to assembling the filtration means 5.

As illustrated in FIGS. 1a and 1b, said container body 4' forming said upstream enclosure 4 can be an axial container body 4" having an axial direction 43, said body 4" comprising a base 410, a lateral skirt 411 having a typically circular cross section in a plane perpendicular to said axial direction 43, and said opening 42 typically having said cross section.

According to the invention and as illustrated in FIGS. 2a to 3b, said filtration means 5 can form a composite filtration element 5' comprising a peripheral portion 50 assembled in a sealed manner to said container body 4', 4", and a filtering central portion 51.

Said filtering central portion 51 can form a filter cloth 51' and said peripheral portion 50 can form an annular part 50' made of plastic overmolding the whole of a peripheral edge 510 of said filter cloth 51' so as to secure said filter cloth 51' to said annular part 50', and such that all of said upstream fluid flowing from said upstream enclosure 4 toward said downstream enclosure 2' passes through said filter cloth 51' in order to rid said upstream fluid of said solid particles.

Figure 3A:
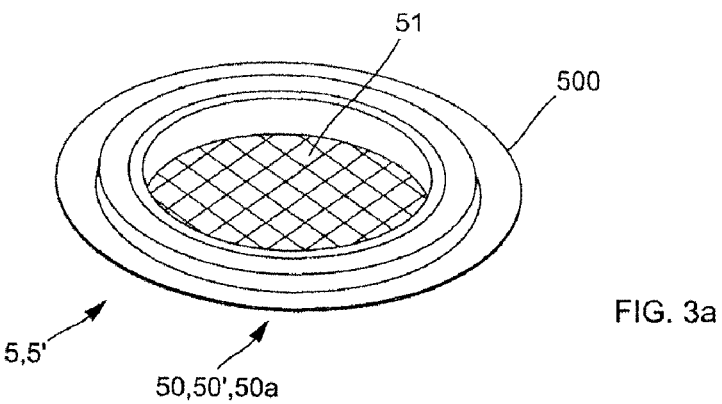
Figure 3B:
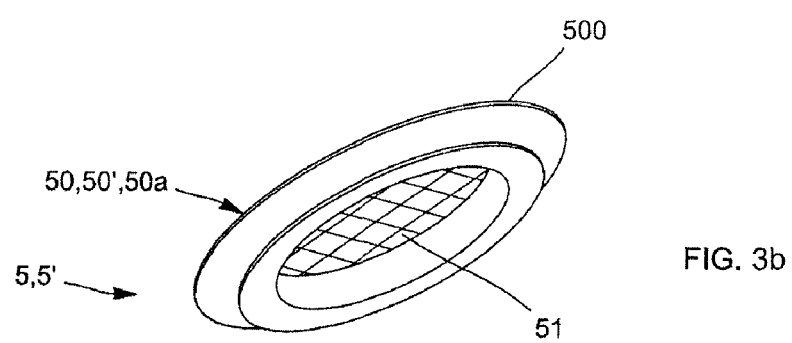

According to one configuration illustrated in FIGS. 3a and 3b, said annular part 50' can be a part termed a short annular part 50a, said short annular part 50a essentially comprising an annular sealing lip 500.

In one advantageous embodiment, said filter cloth 51' has a mesh size of between 50 and 250 μm, preferably between 100 and 150 μm. By way of example, a mesh size of 120 μm is very suitable. Said central filtering portion 51 can be formed of polyamide (PA) or polypropylene (PP).

Figure 2A:
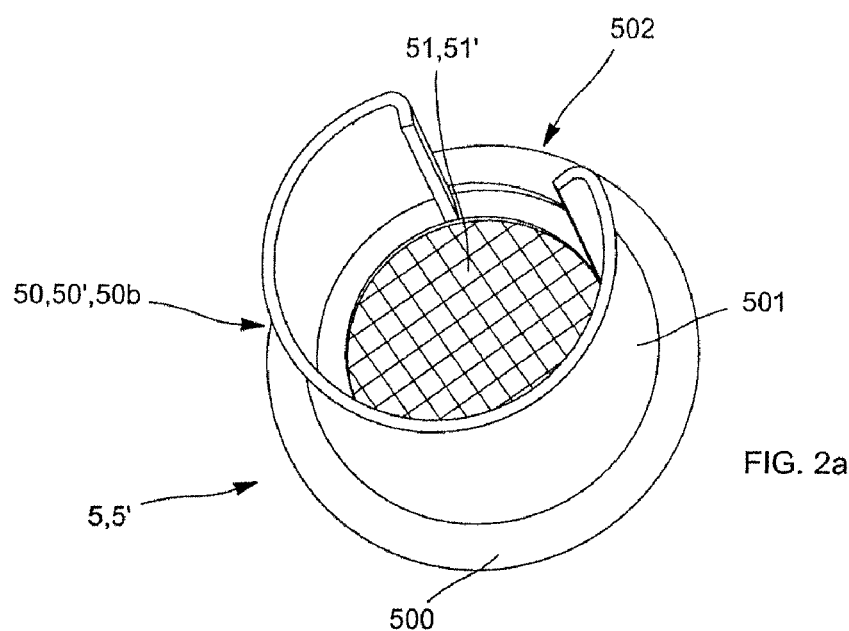
FIGS. 2a and 2b are perspective views relating to a filtration means 5 comprising a part termed a long annular part 50b.
Figure 2B:
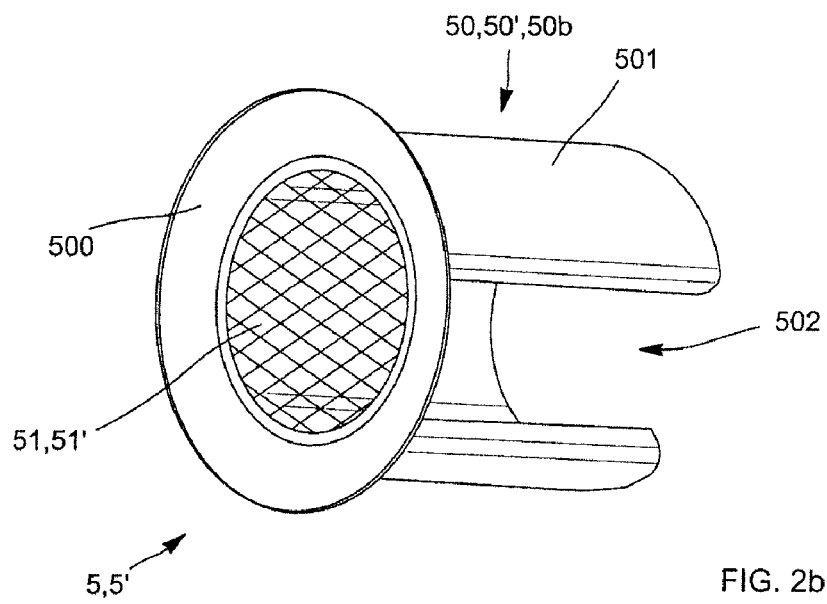

According to another configuration illustrated in FIGS. 2a and 2b, said annular part 50' can be a part termed a long annular part 50b, said long annular part 50b comprising said sealing lip 500 and an axial projection 501 designed to slide inside said container body 4', 4", said axial projection 501 advantageously comprising a cut-out portion 502 facing said inlet nozzle 40.

In one particular embodiment, said sealing lip 500 can cooperate in a sealed manner with a flange 412 of said container body 4', 4", advantageously by means of an annular weld.

Figure 3C:
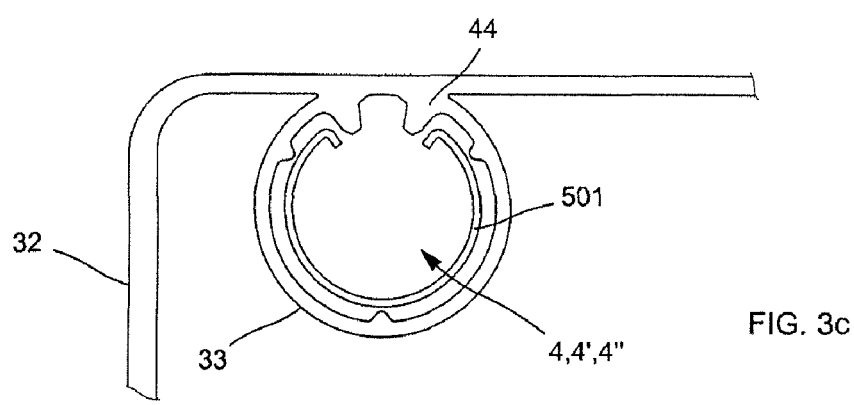
FIG. 3c is a section through said part of FIG. 1a, on the horizontal plane A-A of FIG. 1a, said horizontal plane being perpendicular to said axial direction 11.

As can be seen from FIGS. 1b, 3c and 5b, said container body 4', 4" can comprise at least one inner radial projection 44 providing a predetermined axial positioning for said filtration means 5 with respect to said container body 4', 4".

As illustrated in FIGS. 4a to 5a, said device 1 can comprise a means 6 for detecting the level of said downstream hydraulic fluid in said downstream enclosure 2'.

It can be seen from these same figures that said reservoir 3 can comprise an upper opening 37 closed by a removable cap 38 so as to allow a filling, for example an initial filling, of said downstream enclosure 2' with hydraulic brake fluid.

As illustrated in FIG. 5a, said assembly plane 36 can be a horizontal plane 36', said horizontal assembly plane 36', being intended to be located preferably above the level of said downstream hydraulic fluid in said downstream enclosure 2'.

According to the invention, said filtration means 5 can have a filtering area ranging from 0.15 $cm^2$ to 100 $cm^2$, preferably from 2 $cm^2$ to 20 $cm^2$, and preferably still from 3 $cm^2$ to 10 $cm^2$. This large filtering area has an advantage over an installation of the filtration means in a hydraulic line, since hydraulic lines generally have quite a small diameter of around 4 or 5 mm. Owing to the large filtering area, the filtration means is not at risk of being obstructed by the particles and debris which it retains.

Moreover, given the installation of the filtration means 5 in the supply reservoir 3 and given its geometric arrangement, most of the retained particles and debris drop to the bottom of the upstream portion 31 of said reservoir 3, where they are not at risk of being entrained into the outlet nozzles 20. However, it would not constitute a departure from the scope of the present invention to design the filtration means to extend vertically and/or obliquely. According to the findings observed by the Applicant, the device according to the invention makes it possible to use the same filter cloth throughout the life of the device in the knowledge that, given the method, namely welding, used to assembly the two shells which form said device, it is virtually impossible to replace said filter cloth.

Typically, said downstream enclosure 2' and said upstream enclosure 4 can have storage capacities respectively designated $C_V$ and $C_M$ such that the ratio $C_V/C_M$ ranges from 3 to 30.

EXAMPLES

The figures correspond to exemplary embodiments of devices 1 or parts of devices 1 according to the invention.

Two configurations of the device 1, which is represented particularly in FIGS. 4a and 4b, were manufactured:
a) according to a first configuration, the filtration means 5 comprises an annular part with a short skirt 50a as represented in FIGS. 3a and 3b,
b) according to a second configuration, the filtration means 5 comprises an annular part with a long skirt 50b as represented in FIGS. 2a and 2b.

For that purpose: upper shells 35, 35' were manufactured or made available by molding a plastic, for example a polypropylene; a first configuration 34a of lower shell 34, 34' tailored to said annular part 50a with a short skirt was manufactured, as illustrated in FIGS. 5a and 5b; a second configuration 34b of lower shell 34, 34' tailored to said annular part 50b with a long skirt was manufactured, as illustrated in FIGS. 1a and 1b, the lower shells 34, 34', 34a, 34b being formed by molding a thermoplastic, for example a polypropylene. In this case, as can be seen from FIGS. 1a, 1b and 3c, said upstream enclosure 4, 4', 4" comprises a plurality of radial projections 44 and 44' intended to cooperate with the axial projection 501 of the long annular part 50b; the detection means 6 was formed or made available and it was assembled to said upper shell 35, 35'; two configurations of said filtration means 5, 5' were formed or made available, a first configuration 50a according to FIGS. 3a and 3b and a second configuration 50b according to FIGS. 2a and 2b. Filtration means 50a, 50b were manufactured for example by overmolding the edge 510 of a circular portion of filter cloth 51' into said annular plastic part 50' forming said peripheral portion 50; the filtration means 50a, 50b was assembled in a sealed manner to the corresponding lower shell 34a, 34b, for example by welding the annular sealing lip 500 to the opening 42 of said upstream enclosure 4 and, for example, to the flange 412 of the lateral skirt 411 forming said upstream wall 41; finally, the edges 340, 350 of the shells 34, 35 were welded to one another so as to form said plastic reservoirs 3, 3'.

Upper shells 35, 35' and lower shells 34, 34', 34a, 34b made of polyamide were also manufactured.

Advantageously, filter cloths 51 consisting of PP were used in the case of shells made of PP and cloths made of PA were used in the case of shells made of PA, so as to make it easier to weld the filter cloth 51 to the lower shell 34, 34', 34a, 34b.

LIST OF REFERENCES

| Supply device | 1 |
| --- | --- |
| Wall common to 32 and to 4/4' | 10 |
| First common wall | 10a |
| Second common wall | 10b |
| Axial direction | 11 |
| Enclosure for hydraulic brake fluid | 2 |
| Downstream enclosure | 2' |
| Outlet nozzle | 20 |
| Inlet orifice | 21 |
| Intermediate orifice | 21' |
| Partial bulkhead | 22 |
| Reservoir | 3 |
| Reservoir made of plastic | 3' |
| Downstream portion of 3 forming 2' | 30 |
| Upstream portion forming 4 | 31 |
| Outer wall | 32 |
| Bottom portion or base | 320 |
| Lateral portion, side wall | 321 |
| Upper portion, crown | 322 |
| Inner wall | 33 |
| Lower shell | 34, 34', 34a, 34b, |
| Upper flange | 340 |
| Upper shell | 35, 35' |
| Lower flange | 35 |
| Assembly plane | 36 |
| Horizontal assembly plane | 36' |
| Opening | 37 |
| Upper opening | 37' |
| Removable cap | 38 |
| Upstream enclosure | 4 |
| Container body | 4' |
| Axial container body | 4" |
| Inlet nozzle | 40 |
| Upstream wall | 41 |
| Base | 410 |
| Lateral skirt | 411 |
| Flange of 411 | 412 |
| Opening of 4, 4' | 42 |
| Axial direction of 4" | 43 |
| Inner radial projection | 44, 44' |
| Filtration means | 5 |
| Composite part | 5' |
| Peripheral portion | 50 |
| Annular part made of plastic | 50' |
| Annular part with a short skirt | 50a |
| Annular part with a long skirt | 50b |
| Annular sealing lip | 500 |
| Axial projection | 501 |
| Cut-out portion facing 40 | 502 |
| Filtering central portion | 51 |
| Filter cloth | 51' |
| Overmolded edge of 51, 51' | 510 |
| Level detection means | 6 |

The invention claimed is:

1. Device (1) for supplying a downstream hydraulic brake fluid to a hydraulic brake circuit of a motor vehicle equipped with a hydraulically controlled clutch, comprising an enclosure (2) to contain said hydraulic fluid, said enclosure (2) being provided with at least one outlet nozzle (20) supplying said hydraulic brake circuit, and with an inlet orifice (21) allowing said downstream hydraulic fluid to be introduced into said enclosure (2) so as to compensate for any loss or consumption of said downstream hydraulic fluid in said hydraulic brake circuit, characterized in that:
   a) said enclosure (2) is a downstream enclosure (2'), forming a downstream portion (30) of a reservoir (3), said reservoir (3) comprising an upstream portion (31) forming an upstream enclosure (4), to be supplied with an upstream hydraulic fluid from the clutch of said vehicle,
   b) said upstream enclosure (4) comprises at least one inlet nozzle (40), said inlet nozzle (40) to transfer said upstream hydraulic fluid from said clutch toward said upstream enclosure (4),
   c) said inlet orifice (21) is an intermediate orifice (21') whereby said upstream enclosure (4) opens into said downstream enclosure (2'), said intermediate orifice (21') being equipped with a means (5) for filtering said upstream hydraulic fluid so as to continuously convert upstream hydraulic fluid into downstream hydraulic fluid devoid of solid particles for supplying said hydraulic brake circuit,
   d) said filtration means (5) forms a composite filtration element (5') comprising a peripheral portion (50) assembled in a sealed manner to a container body (4', 4") and surrounding a central opening, and a filtering central portion (51) secured to said peripheral portion (50) and covering the entire central opening, said peripheral portion and said filtering central portion (51) covering said intermediate orifice (21').

2. Device according to claim 1 in which said reservoir (3) comprises an outer wall (32), said outer wall (32) being traversed by said outlet nozzle (20) and said inlet nozzle (40) and comprising a bottom portion (320) forming a base, a lateral portion (321) forming a side wall and an upper portion (322) forming a crown, and an inner wall (33) forming, together with said filtration means (5), a partition of said reservoir (3) which isolates said upstream enclosure (4) and said downstream enclosure (2').

3. Device according to claim 1 in which said reservoir (3) is a reservoir (3') made of plastic comprising a lower shell (34) and an upper shell (35), said lower shell (34) and said upper shell (35) being molded parts (34', 35') assembled by respective assembly flanges, said lower shell (34) having an upper assembly flange (340) cooperating with a lower assembly flange (350) of said upper shell (35) in an assembly plane (36) so as to form said reservoir (3).

4. Device according to claim 3 in which said assembly plane (36) is a horizontal plane (36'), said horizontal assembly plane (36') located above the level of said downstream hydraulic fluid in said downstream enclosure (2').

5. Device according to claim 1 comprising a means (6) for detecting the level of said downstream hydraulic fluid in said downstream enclosure (2').

6. Device according to claim 1 in which said reservoir (3) comprises an upper opening (37) closed by a removable cap so as to allow a filling of said downstream enclosure (2') with hydraulic brake fluid.

7. Device according to claim 1 in which said filtration means has a filtering area ranging from 0.15 cm² to 100 cm².

8. Device according to claim 7 in which said filtering area ranges from 2 cm² to 20 cm².

9. Device according to claim 8 in which said filtering area ranges from 3 cm² to 10 cm².

10. Device according to claim 1 in which said downstream enclosure (2') and said upstream enclosure (4) have storage capacities respectively designated $C_V$ and $C_M$ and the ratio $C_V/C_M$ ranges from 3 to 30.

11. Device according to claim 1 in which said filtering central portion (51) forms a filter cloth (51') and in which said peripheral portion (50) forms an annular part (50') made of plastic overmolding a peripheral edge (510) of said filter cloth (51') so as to secure said filter cloth (51') to said annular part (50'), and such that all of said upstream fluid flowing through said intermediate orifice (21') passes through said filter cloth (51').

12. Device according to claim 1 in which said peripheral portion (50) forms an annular part (50') and in which said annular part (50') is a long annular part (50b), said long annular part (50b) comprising a sealing lip (500) and an axial projection (501) positioned inside said upstream enclosure (4), said axial projection (501) comprising a cut-out portion (502) facing said inlet nozzle (40).

13. Device (1) for supplying a hydraulic brake fluid, termed a downstream hydraulic fluid, to a hydraulic brake circuit of a motor vehicle equipped with a hydraulically controlled clutch, comprising an enclosure (2) to contain said hydraulic fluid, said enclosure (2) being provided with at least one outlet nozzle (20) supplying said hydraulic brake circuit, and with an inlet orifice (21) allowing said downstream hydraulic fluid to be introduced into said enclosure (2) so as to compensate for an loss or consumption of said downstream hydraulic fluid in said hydraulic brake circuit, characterized in that:
   a) said enclosure (2) is a downstream enclosure (2'), forming a downstream portion (30) of a reservoir (3), said reservoir (3) comprising an upstream portion (31) forming an upstream enclosure (4), to be supplied with a hydraulic fluid, termed an upstream hydraulic fluid, from the clutch of said vehicle,
   b) said upstream enclosure (4) comprises at least one inlet nozzle (40), said inlet nozzle (40) to transfer said upstream hydraulic fluid from said clutch toward said upstream enclosure (4),
   c) said inlet orifice (21) is an intermediate orifice (21') whereby said upstream enclosure (4) opens into said downstream enclosure (2'), said intermediate orifice (21') being equipped with a means (5) for filtering said upstream hydraulic fluid so as to continuously convert upstream hydraulic fluid into downstream hydraulic fluid devoid of solid particles for supplying said hydraulic brake circuit,
   d) said filtration means (5) forms a composite filtration element (5') comprising a peripheral portion (50) assembled in a sealed manner to a container body (4', 4"), and a filtering central portion (51),
   said upstream enclosure (4) forms a container body (4') equipped with an upstream wall (41), comprising an opening (42) cooperating with said filtration means (5), one portion of said upstream wall (41) forming said inner wall (33), the other portion of said upstream wall (41) forming a common wall (10) with said outer wall (32), said common wall (10) being traversed by said inlet nozzle (40).

14. Device according to claim 13 in which said common wall (10) comprises a first common wall (10a) forming part of said lateral portion (321) of said reservoir (3).

15. Device according to claim 13 in which said common wall (10) comprises a second common wall (10b) forming part of said bottom portion (320) of said reservoir (3).

16. Device according to claim 13 in which, said container body (4') forming said upstream enclosure (4) is an axial container body (4") having an axial direction (43), said body (4") comprising a base (410), a lateral skirt (411) having a circular cross section in a plane perpendicular to said axial direction (43), and said opening (42) having said circular cross section.

17. Device according to claim 16 in which said filtering central portion (51) forms a filter cloth (51') and in which said peripheral portion (50) forms an annular part (50') made of plastic overmolding a peripheral edge (510) of said filter doth (51') so as to secure said filter cloth (51') to said annular part (50'), and such that all of said upstream fluid flowing from said upstream enclosure (4) toward said downstream enclosure (2') passes through said filter cloth (51').

18. Device according to claim 17 in which said annular part (50') is a short annular part (50a), said short annular part (50a) essentially comprising an annular sealing lip (500).

19. Device according to claim 18 in which said sealing lip (500) cooperates in a sealed manner with a flange (412) of said container body (4', 4"), by means of an annular weld.

20. Device according to claim 17 in which said annular part (50') is a long annular part (50b), said long annular part (50b) comprising a sealing lip (500) and an axial projection (501) slidable inside said container body (4', 4"), said axial projection (501) comprising a cut-out portion (502) facing said inlet nozzle (40).

21. Device according to claim 13 in which said container body (4', 4") comprises at least one inner radial projection (44) providing a predetermined axial positioning for said filtration means (5) with respect to said container body (4', 4").

\* \* \* \* \*